US010953745B2

(12) United States Patent
Jasud et al.

(10) Patent No.: US 10,953,745 B2
(45) Date of Patent: Mar. 23, 2021

(54) MULTI-STAGE PLANETARY REDUCTION DRIVE APPARATUS FOR VEHICLE AND MOUNTING ARRANGEMENT THEREOF

(71) Applicants: Dana (WUXI) Technology Co., Ltd., Jiangsu (CN); Dana Italia S.R.L., Arco (IT)

(72) Inventors: Pradip Jasud, Pune (IN); Yang Liu, Wuxi (CN); Jarret Davis, Arco (IT); Sergio Artioli, Reggio Emilia (IT)

(73) Assignees: Dana (WUXI) Technology Co., Ltd., Jiangsu (CN); Dana Italia, S.r.L., Arco (IT)

( * ) Notice: Subject to any disclaimer, the term of this patent is extended or adjusted under 35 U.S.C. 154(b) by 0 days.

(21) Appl. No.: 16/403,958

(22) Filed: May 6, 2019

(65) Prior Publication Data

US 2019/0344659 A1 Nov. 14, 2019

(30) Foreign Application Priority Data

May 8, 2018 (CN) .......................... 201810432483.0

(51) Int. Cl.
*B60K 7/00* (2006.01)
*B60K 17/04* (2006.01)
(Continued)

(52) U.S. Cl.
CPC .......... *B60K 17/046* (2013.01); *B60K 7/0007* (2013.01); *B60K 7/0015* (2013.01);
(Continued)

(58) Field of Classification Search
CPC ........ B60K 6/442; B60K 1/06; B60K 17/046; B60K 7/0007; B60K 7/0015; F16H 1/46; F16H 47/04; F16H 3/54
See application file for complete search history.

(56) References Cited

U.S. PATENT DOCUMENTS 3,737,000 A * 6/1973 Knobloch ............ B60K 17/046
180/369
4,662,246 A * 5/1987 Cheek .................. B62D 55/125
475/331
(Continued)

FOREIGN PATENT DOCUMENTS

| CN | 102139629 | 8/2011 |
| EP | 2127934 | 12/2009 |
| WO | 2018034647 | 2/2018 |

OTHER PUBLICATIONS

European Patent Office, International Search Report with Written Opinion issued in EP19172973.0-1012, dated Aug. 9, 2019, 8 pages, European Patent Office, Rijswijk, Netherlands.

*Primary Examiner* — Hau V Phan
(74) *Attorney, Agent, or Firm* — Marshall & Melhorn, LLC (57) ABSTRACT

A multi-stage planetary reduction drive apparatus for a vehicle including a first-stage planetary reduction unit and a second-stage planetary reduction unit. A first primary housing and a first secondary housing of the first-stage planetary reduction unit are joined to enclose inner components of the first-stage planetary reduction unit, and may be directly mounted to a vehicle frame. A mounting arrangement with mounting openings on both sides of the vehicle frame, a mounting flange, and a fastening member. A power transmission system including the drive apparatus, a vehicle frame, a mounting arrangement, and a power source. The drive apparatus is aligned with and directly connected to the power source in an axial direction.

4 Claims, 6 Drawing Sheets

(51) Int. Cl.
*F16H 1/46* (2006.01)
*F16H 57/025* (2012.01)
*F16H 57/02* (2012.01)

(52) U.S. Cl.
CPC ............ *F16H 1/46* (2013.01); *F16H 57/025* (2013.01); *B60K 2007/0046* (2013.01); *B60K 2007/0092* (2013.01); *F16H 2057/02034* (2013.01); *F16H 2057/02056* (2013.01)

(56) References Cited

U.S. PATENT DOCUMENTS

| | | | | |
|---|---|---|---|---|
| 5,419,406 | A * | 5/1995 | Kawamoto | B60K 1/02 180/65.6 |
| 6,117,040 | A * | 9/2000 | Watterodt | F16H 3/54 475/138 |
| 6,811,509 | B1 * | 11/2004 | Langenfeld | F16H 47/04 180/308 |
| 6,840,879 | B1 * | 1/2005 | Langenfeld | F16H 47/04 475/83 |
| 7,112,155 | B2 | 9/2006 | Keuth | |
| 8,221,276 | B1 * | 7/2012 | Langenfeld | F16H 57/04 475/83 |
| 8,541,915 | B2 * | 9/2013 | Burns | B60L 3/0061 310/54 |
| 8,641,568 | B2 * | 2/2014 | Knoblauch | B60K 6/442 475/150 |
| 9,145,961 | B2 * | 9/2015 | Suzuki | B60K 6/448 |
| 2012/0286629 | A1 * | 11/2012 | Johnson | B25J 9/08 310/68 B |

* cited by examiner

Prior Art

MULTI-STAGE PLANETARY REDUCTION DRIVE APPARATUS FOR VEHICLE AND MOUNTING ARRANGEMENT THEREOF

TECHNICAL FIELD

A device that relates to a drive apparatus, and in particular, to a multi-stage planetary reduction drive apparatus for a vehicle and a mounting arrangement is disclosed.

BACKGROUND

Currently, the drive apparatus adopted in mining vehicles is similar to the traditional axle assembly. Specifically, such a drive apparatus has an axle housing and wheel end assemblies on both sides. The axle housing accommodates conventional power train components, such as bevel gear or a differential. The wheel end assemblies are connected to left and right wheels, respectively.

A power source is generally disposed separately from the drive apparatus in a longitudinal direction of the vehicle frame, and then connected to the power train components, such as the spiral bevel gear or the differential, by of an output shaft of the power source. The power is transmitted from the power source to the left and right wheels through the power train components in the axle housing, the left-side wheel end assembly and the right-side wheel end assembly.

Corresponding pad mounting structures are disposed on the vehicle frame and the axle housing. The whole drive apparatus including the axle housing is mounted below the vehicle frame by the pad mounting structures.

However, the conventional combination of the drive apparatus and the vehicle frame has the following defects. Firstly, the axle housing is very cumbersome and occupies a relatively large space below the vehicle frame. Secondly, the pad mounting structure is also cumbersome and occupies a relatively large space at the sides of the vehicle frame. In other words, such a conventional combination of the drive apparatus and the vehicle frame cannot realize lightweight and may bring a relatively high material cost, and the structure thereof is not sufficiently compact. In addition, the cumbersome axle housing and pad mounting structure may bring inconvenience in mounting. Further, the application of such a drive apparatus is also limited, and the reduction ratio of the drive apparatus cannot be adjusted conveniently.

SUMMARY

The present device is directed to a multi-stage planetary reduction drive apparatus for a vehicle, comprising: a first-stage planetary reduction unit including: a first input joint, a first sun gear, an assembly of a first planet carrier and a planet gear, a first gear ring, and a first output joint, wherein the first input joint is connected to the first sun gear. The first sun gear is associated with the assembly of the first planet carrier and the planet gear, and that assembly is connected to the first output joint. A second-stage planetary reduction unit including: an axle shaft, a second sun gear, an assembly of second a planet carrier and a planet gear, a second gear ring, and a wheel hub, wherein the axle shaft is connected to the first-stage planetary reduction unit and the second sun gear. The second sun gear is associated with the assembly of the second planet carrier and the planet gear, and that assembly is connected to the wheel hub. The first-stage planetary reduction unit further comprises a first primary housing and a first secondary housing, the first primary housing and the first secondary housing are joined to each other to enclose inner components of the first-stage planetary reduction unit, and the first primary housing further serves as a structural member directly mounted to a vehicle frame.

The drive apparatus of the present device can be directly mounted to the vehicle frame by the first primary housing of the first-stage planetary reduction unit.

Another embodiment provides a power transmission system for a vehicle, comprising: a drive apparatus, a vehicle frame, the mounting arrangement previously described for mounting the drive apparatus of the vehicle to the vehicle frame, and a power source, wherein the drive apparatus is aligned with and directly connected to the power source in an axial direction.

Various aspects of this device will become apparent to those skilled in the art from the following detailed description of the preferred embodiment, when read in light of the accompanying drawings.

DESCRIPTION OF THE DRAWINGS

The features and advantages of the present invention can be better understood with reference to the detailed descriptions of the illustrative embodiments employing the principles of the present invention. In the drawings.

DETAILED DESCRIPTION OF THE EMBODIMENTS

A drive apparatus and a mounting arrangement thereof according to a preferred embodiment of the present invention will be described below with reference to FIG. 2 to FIG. 6.

Figure 2:
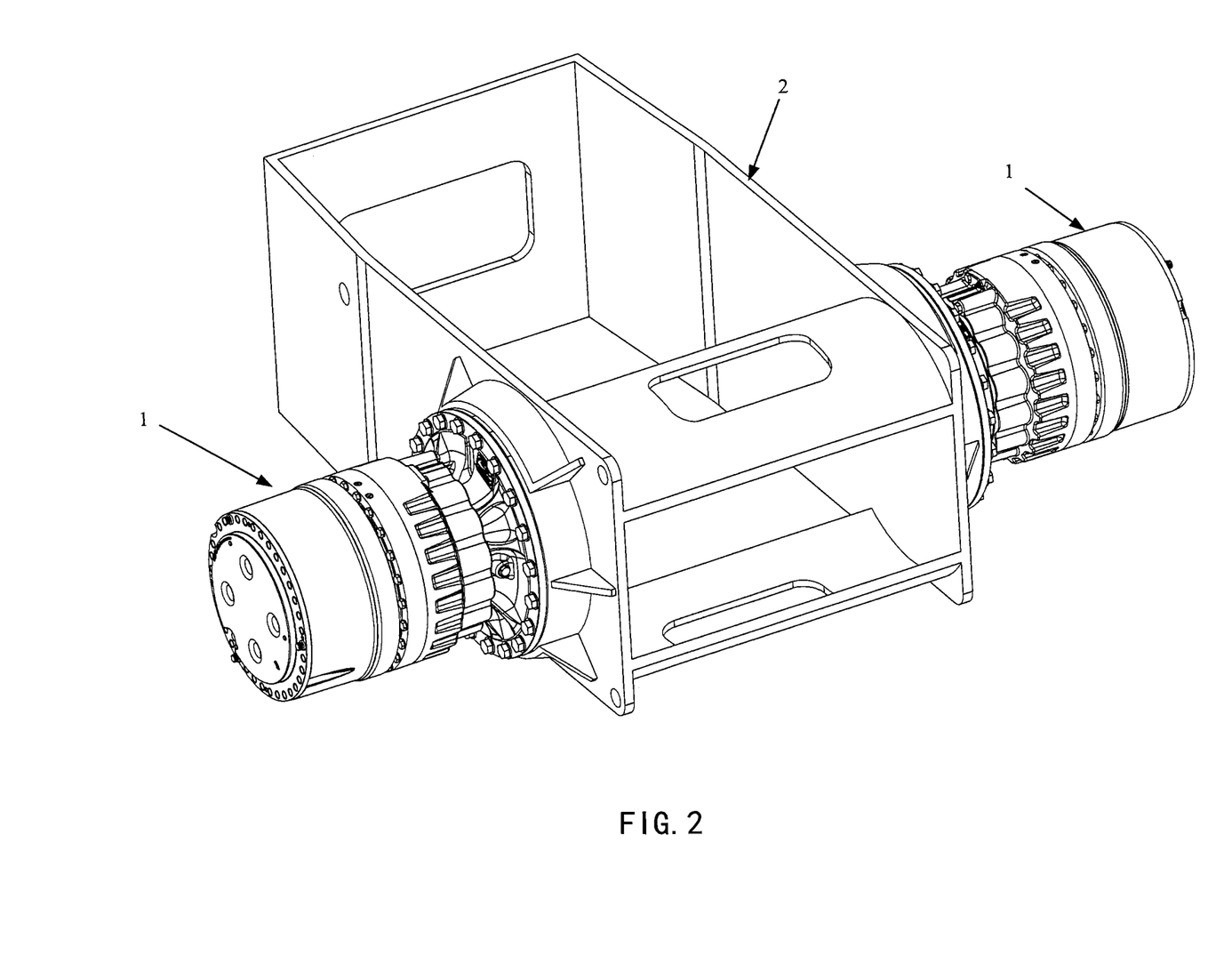
FIG. 2 is a perspective view of a combination of a drive apparatus and a vehicle frame according to a preferred embodiment of the present invention.

FIG. 2 shows a multi-stage planetary reduction drive apparatus 1 and a vehicle frame 2 according to the preferred embodiment of the present device. As shown in the figure, in the drive apparatus 1 comprises two parts or units for the wheels on both sides, wherein the two parts are separately mounted on both sides of the vehicle frame 2. However, it should be understood that, since the two parts of the drive apparatus 1 are identical and can be respectively mounted to the vehicle frame 2, only one of the two parts will be described in the following description and will be referred to as "drive apparatus 1".

Figure 3:
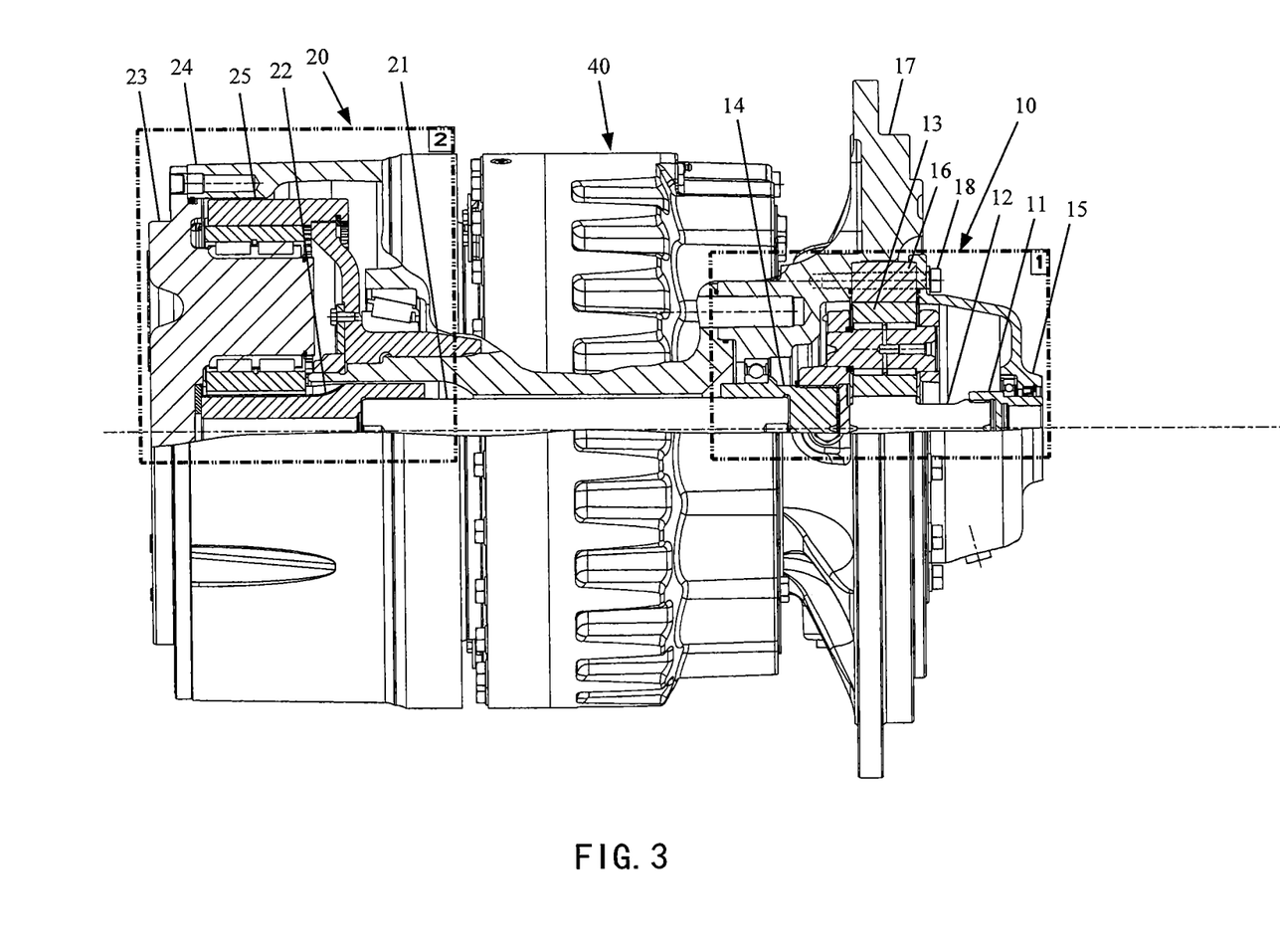
FIG. 3 is a front view of the drive apparatus according to the preferred embodiment of the present invention, wherein inner structures of a first-stage planetary reduction assembly and a second-stage planetary reduction assembly are shown in a partial section.

FIG. 3 shows the drive apparatus 1 according to the preferred embodiment of the present device. As shown in the figure, the drive apparatus 1 comprises a first-stage planetary reduction unit 10, a second-stage planetary reduction unit 20, and a brake unit 40. The first-stage planetary reduction unit 10 is directly connected to a power source (refer to FIG. 4 to FIG. 6), and the second-stage planetary reduction unit 20 is connected to the wheels (not shown in the figures). The brake unit 40 is disposed between the first-stage planetary reduction unit 10 and the second-stage planetary reduction unit 20.

The first-stage planetary reduction unit 10 comprises: a first input joint 11, a first sun gear 12, an assembly 13 of first planet carrier and planet gear, a first gear ring 16, and a first output joint 14. The first input joint 11 is connected to the first sun gear 12. The first sun gear 12 is associated with the assembly 13 of first planet carrier and planet gear. The assembly 13 of first planet carrier and planet gear is connected to the first output joint 14.

The first-stage planetary reduction unit 10 further comprises a first primary housing 17 and a first secondary housing 15. The first primary housing 17 and the first secondary housing 15 are joined to each other via, for example, bolts 18, so as to enclose the inner components of the first-stage planetary reduction unit 10. In addition to being used as a housing, the first primary housing 17 further serves as a primary structural member and is directly mounted to the vehicle frame 2. The first secondary housing 15 is mainly used to accommodate bearings, seals, and the like, and thus also being referred to as "bearing and sealing retaining member".

The second-stage planetary reduction unit 20 is connected to the first-stage planetary reduction unit 10 by an axle shaft 21. In other words, the axle shaft 21 serves as a second input part of the second-stage planetary reduction unit 20. The second-stage planetary reduction unit 20 comprises: a second sun gear 22, an assembly 23 of second planet carrier and planet gear, and a second gear ring 25. The second-stage planetary reduction unit 20 is finally connected to a wheel hub 24. In other words, the wheel hub 24 serves as a second output part of the second-stage planetary reduction unit 20.

The brake unit 40 disposed between the first-stage planetary reduction unit 10 and the second-stage planetary reduction unit 20 can brake the axle shaft 21. The brake unit can, for example, adopt an available "SPICER POSI" brake. It should be understood that, although in the preferred embodiment of the present invention the brake unit 40 is included in the drive apparatus 1, the brake unit may be combined with other systems or components. Further, in addition to the position between the first-stage planetary reduction unit 10 and the second-stage planetary reduction unit 20, the brake unit 40 may be disposed in other mounting positions.

Figure 4:
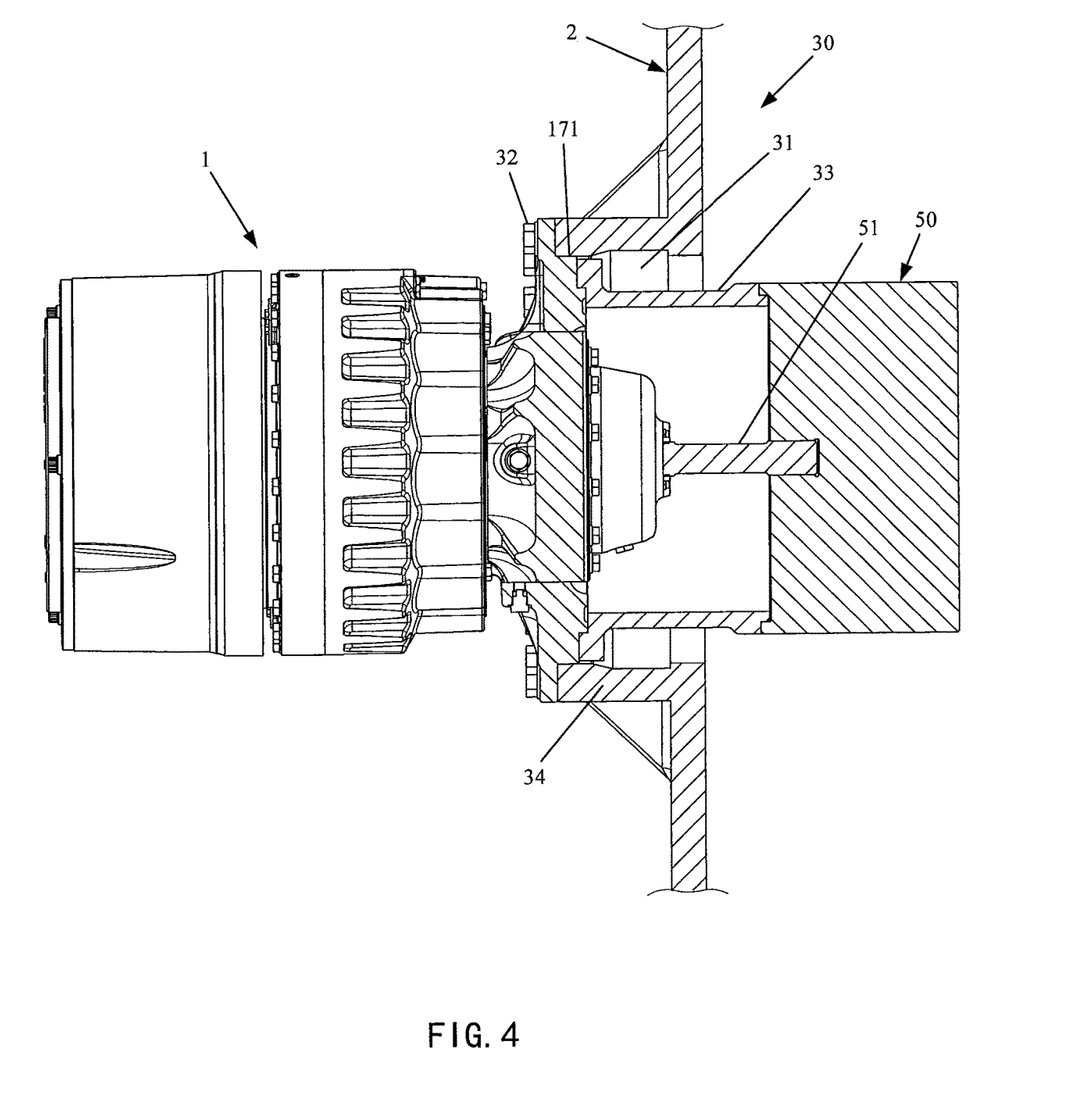
FIG. 4 is a front view of the drive apparatus and the mounting arrangement thereof according to the preferred embodiment of the present invention, wherein the mounting arrangement of the drive apparatus is shown in a partial section.
Figure 5:
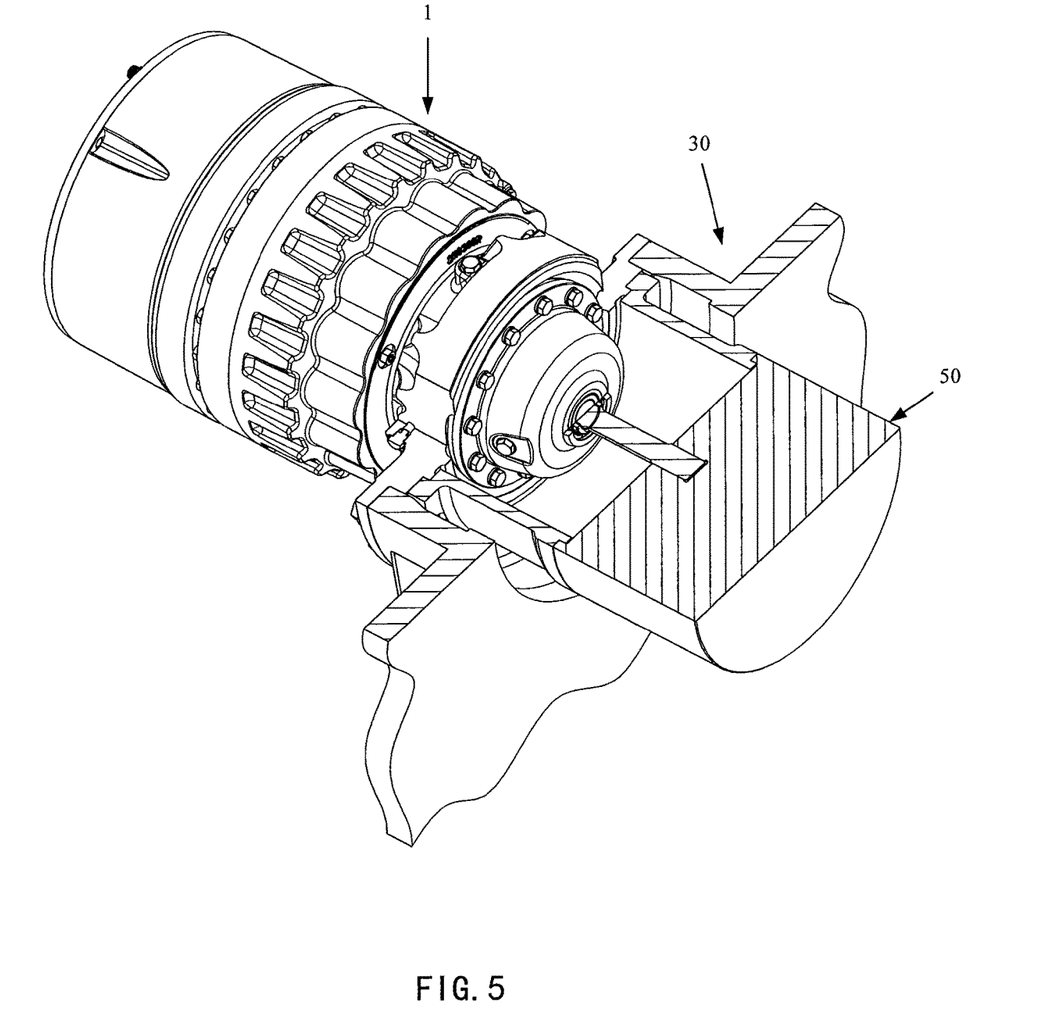
FIG. 5 is a perspective view of the drive apparatus and the mounting arrangement thereof according to the preferred embodiment of the present invention, wherein the mounting arrangement of the drive apparatus is shown in a partial section.
Figure 6:
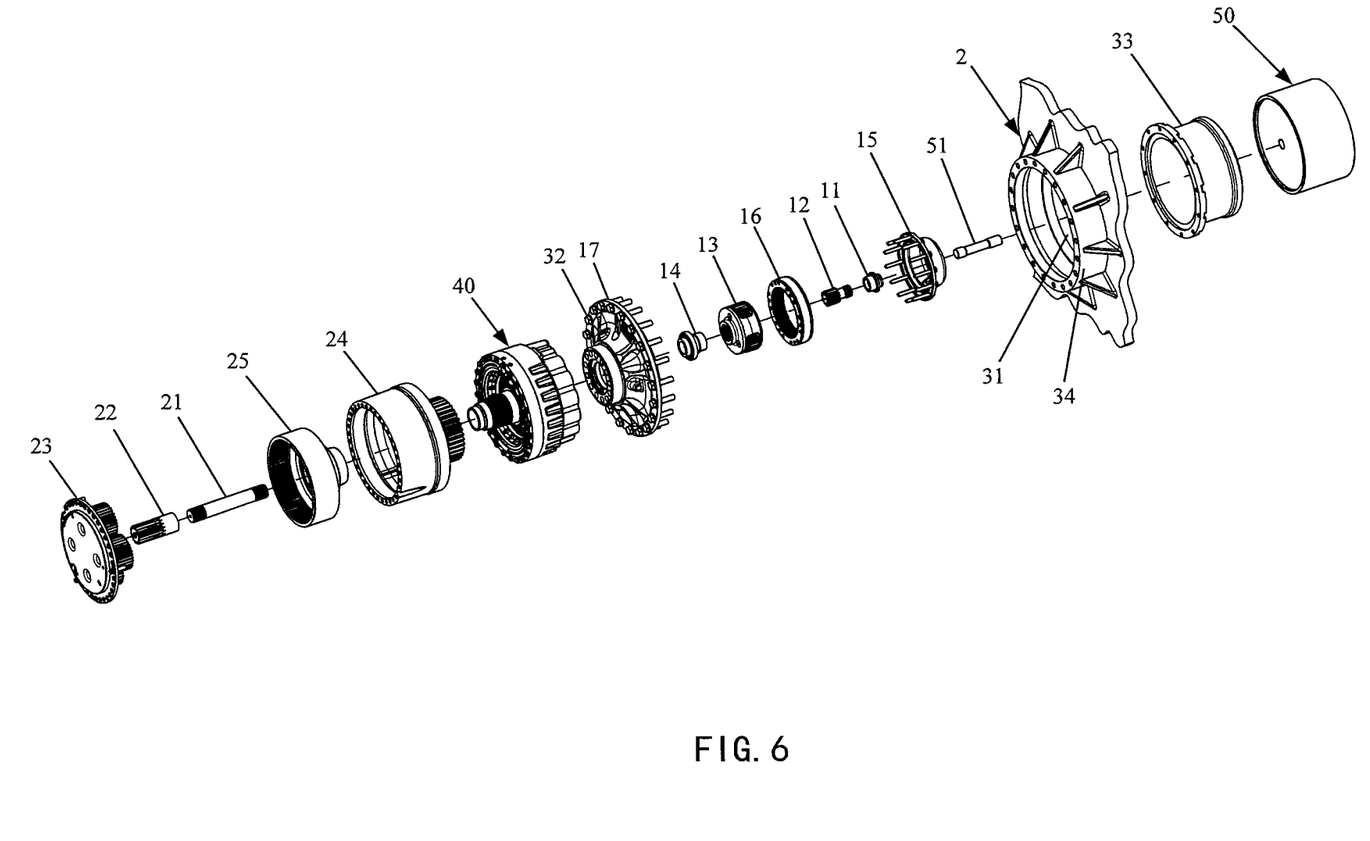
FIG. 6 is a perspective exploded view of the drive apparatus and the mounting arrangement thereof according to the preferred embodiment of the present invention.

FIG. 4 and FIG. 5 show the mounting arrangement 30 of the drive apparatus according to the preferred embodiment of the present device. As shown in FIG. 4 and FIG. 5, the drive apparatus 1 according to the preferred embodiment of the present device is mounted on both sides of the vehicle frame 2 by the mounting arrangement 30.

The mounting arrangement 30 comprises: mounting openings 31 on both sides of the vehicle frame 2, a mounting flange 34 surrounding one of the mounting openings 31, coupling bolts 32 directly and fixedly mounting the first primary housing 17 to the mounting flange 34, and an adapter 33.

The drive apparatus 1 is connected to the power source 50 by means of the adapter 33. Various types of the power source 50 can be used, for example, an electric motor or a hydraulic motor. The power source 50 has an output shaft 51. In the conventional configuration shown in FIG. 1, the power source is generally disposed separately from the drive apparatus in a longitudinal direction of the vehicle frame, and then connected to power train components, such as the spiral bevel gear or the differential, by an output shaft of the power source. On the contrary, the drive apparatus 1 of the present device can be aligned with and directly connected to the power source 50 in an axial direction, thereby arriving at a simple, compact, and lightweight structure.

The first primary housing 17 has a step portion 171, which radially abuts on an inner wall of the mounting flange 34, and thus bearing a part of the radial loads. Therefore, the step portion 171 can bear a part of the radial loads applied to the bolts 32, so that the service life of the bolts 32 can be extended. The first primary housing 17 further has a structure for fixing the adapter 33. Different adapters 33 can be selected according to different types and/or different power ranges of the power source 50, or the adapter 33 is not necessarily required for use.

The drive apparatus 1, the vehicle frame 2, the mounting arrangement 30 for mounting the drive apparatus 1 to the vehicle frame 2, and the power source 50 of the present invention constitute a power transmission system for vehicle. According to an optimized design of the present invention, the drive apparatus 1 is aligned with and directly connected to the power source 50 in the axial direction.

In the preferred embodiment of the present device, the first-stage planetary reduction unit 10 is a primary reduction mechanism, which can reduce a speed in different reduction ratios and increase torque. Specifically, the output shaft 51 of the power source 50 outputs power to the first input joint 11 of the first-stage planetary reduction unit 10. The first input joint 11 transmits the power to the first sun gear 12. The first sun gear 12 drives the planet gear(s) in the assembly 13 of first planet carrier and planet gear to rotate, so as to further drive the planet carrier to rotate. The assembly 13 of first planet carrier and planet gear is connected to the first output joint 14 by, for example, splines. The first output joint 14 transmits the power to the second-stage planetary reduction unit 20 by the axle shaft 21.

In the second-stage planetary reduction unit 20, the axle shaft 21 drives the second sun gear 22 to rotate. The second sun gear 22 drives the planet gear(s) in the assembly 23 of second planet carrier and planet gear to rotate, so as to further drive the planet carrier to rotate. The planet gear is mounted on a planet pin of the planet carrier. The planet carrier is fixed to the wheel hub 24 by means of coupling bolts, and thus can drive the wheel hub 24 to rotate. The wheel hub 24 finally drives the wheels to rotate.

The first-stage planetary reduction unit 10 can arrive at various reduction ratios by changing the sun gear and the planet gear(s) thereof. In this case, the multi-stage planetary reduction drive apparatus of the present device can be provided with extremely large flexibility, and thus having different total reduction ratios.

The multi-stage planetary reduction drive apparatus of the present device is applicable to different cases. In addition to the two-stage type reduction transmission described above with reference to the preferred embodiment of the present device, more reduction stages can be further added as needed.

Figure 1:
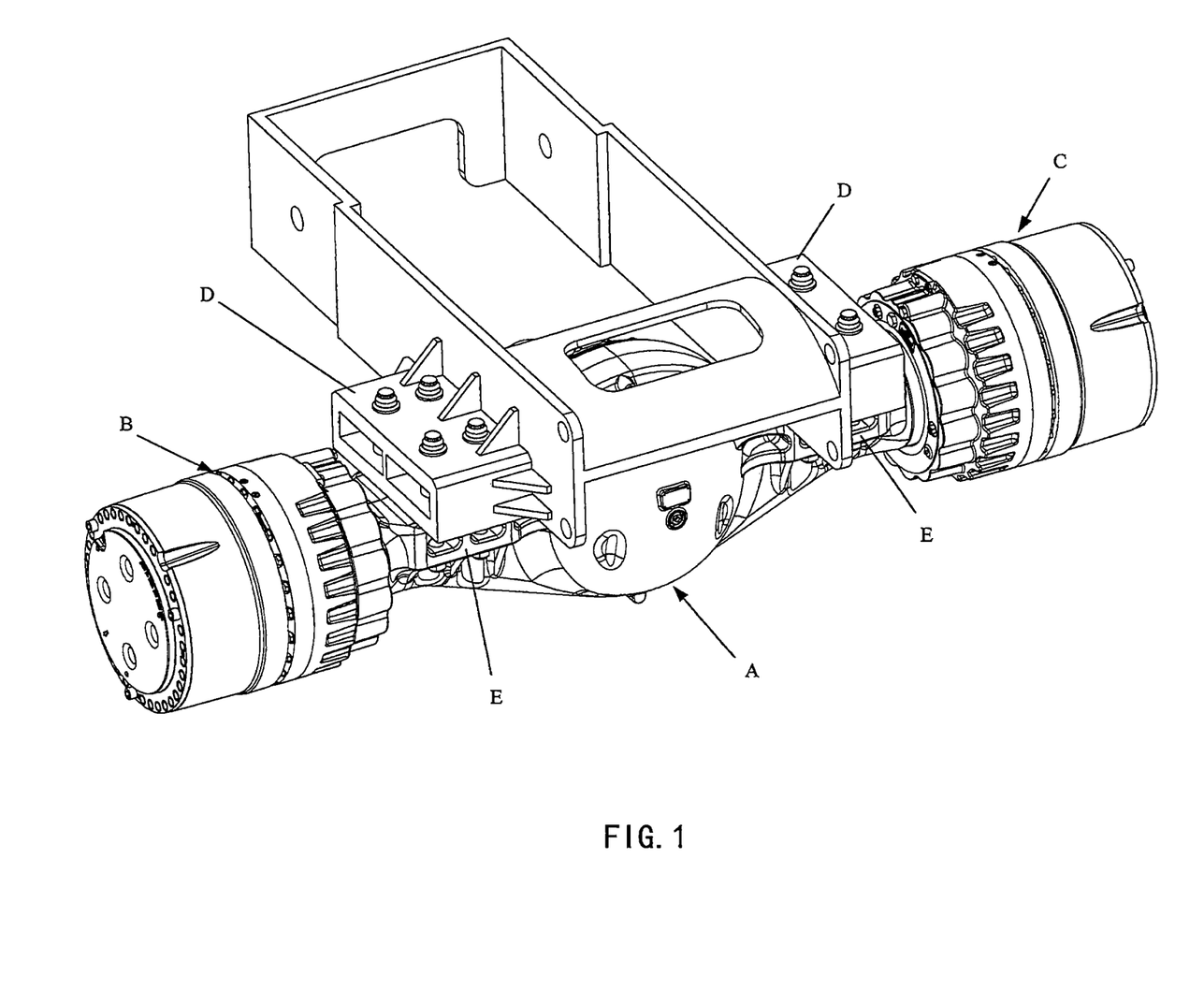
FIG. 1 is a perspective view of a combination of a drive apparatus and a vehicle frame in the prior art.

Since the first primary housing 17 of the first-stage planetary reduction unit 10 can be directly mounted to the vehicle frame 2, the axle housing A of the conventional drive apparatus shown in FIG. 1 and the power train components accommodated therein (for example, the spiral bevel gear or the differential) are not required, and the pad mounting structures D and E on the vehicle frame and the axle housing can be removed. Thus, both the drive apparatus and the vehicle frame are optimized, thereby simplifying the structure and reducing the weight.

It should be understood that, although the description is particularly with respect to the multi-stage planetary reduction drive apparatus 1 in this preferred embodiment, the mounting arrangement of the present device can be further applied to other types of drive apparatus, for example, a single-stage planetary reduction drive apparatus. The drive apparatus, the mounting arrangement, and the power source of the present device constitute a power transmission system particularly applicable to underground mining vehicles, which is also applicable to other types of vehicle.

The preferred embodiments of the present device are illustrated and described in the text. However, for one skilled in the art, the embodiments are provided only for illustration. One skilled in the art could make various modifications, variations, and substitutions without departing from the present device. Therefore, the protection scope of the present device should be defined by the attached claims.

LIST OF THE REFERENCE NUMBERS

A: Axle housing
B: Left-side wheel end assembly
C: Right-side wheel end assembly
D: Pad mounting structure of vehicle frame
E: Pad mounting structure of axle housing
1: Multi-stage planetary reduction drive apparatus
2: Vehicle frame
10: First-stage planetary reduction unit
11: First input joint
12: First sun gear
13: Assembly of first planet carrier and planet gear
14: First output joint
15: First secondary housing
16: First gear ring
17: First primary housing
18: Bolt
20: Second-stage planetary reduction unit
21: Axle shaft
22: Second sun gear
23: Assembly of second planet carrier and planet gear
24: Wheel hub
25: Second gear ring
30: Mounting arrangement
31: Mounting opening
32: Coupling bolt
33: Adapter
34: Mounting flange
40: Brake unit
50: Power source
51: Output shaft of the power source
171: Step portion

The invention claimed is:

1. A multi-stage planetary reduction drive apparatus for a vehicle, comprising:
a first-stage planetary reduction unit including: a first input joint, a first sun gear, a first assembly of a first planet carrier and a planet gear, a first gear ring, and a first output joint, wherein the first input joint is connected to the first sun gear, the first sun gear is associated with the first assembly of the first planet carrier and the planet gear, and the first assembly of the first planet carrier and the planet gear is connected to the first output joint;
a second-stage planetary reduction unit comprising: an axle shaft, a second sun gear, and a second assembly of a second planet carrier and a second planet gear, a second gear ring, and a wheel hub, wherein the axle shaft is connected to the first-stage planetary reduction unit and the second sun gear, the second sun gear is associated with the second assembly of the second planet carrier and the second planet gear, and the second assembly of the second planet carrier and the second planet gear is connected to the wheel hub;
wherein the first-stage planetary reduction unit further comprises a first primary housing and a first secondary housing, the first primary housing and the first secondary housing are joined to each other to enclose inner components of the first-stage planetary reduction unit, and the first primary housing has a step portion radially abutting on an inner wall of the mounting flange and wherein the first primary housing further serves as a structural member directly mounted to a vehicle frame; and
wherein the multi-state planetary reduction drive apparatus further comprises a mounting arrangement comprising: mounting openings on both sides of the vehicle frame, a mounting flange surrounding one of the mounting openings, and a fastening member, wherein the first primary housing of the first-stage planetary reduction unit is directly and fixedly mounted to the mounting flange by the fastening member.

2. The multi-stage planetary reduction drive apparatus for a vehicle according to claim 1, further comprising a brake unit disposed between the first-stage planetary reduction unit and the second-stage planetary reduction unit to brake the wheel hub.

3. The multi-stage planetary reduction drive apparatus for a vehicle according to claim 1, further comprising an adapter fixed to the first primary housing of the first-stage planetary reduction unit and connected to a power source.

4. The multi-stage planetary reduction drive apparatus for a vehicle according to claim 1, wherein the vehicle is a mining vehicle.

* * * * *